United States Patent
Pinkas

(10) Patent No.: US 7,516,326 B2
(45) Date of Patent: Apr. 7, 2009

(54) AUTHENTICATION SYSTEM AND METHOD

(75) Inventor: Binyamin Pinkas, Tel Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 10/965,197

(22) Filed: Oct. 15, 2004

(65) Prior Publication Data

US 2006/0085637 A1 Apr. 20, 2006

(51) Int. Cl.
*H04L 9/00* (2006.01)
(52) U.S. Cl. .................... 713/170; 380/277
(58) Field of Classification Search ............ 713/157, 713/158
See application file for complete search history.

(56) References Cited

U.S. PATENT DOCUMENTS

| | | | | |
|---|---|---|---|---|
| 5,748,736 | A * | 5/1998 | Mittra | 713/163 |
| 5,864,667 | A | 1/1999 | Barkan | |
| 6,715,073 | B1 | 3/2004 | An et al. | |
| 6,801,998 | B1 * | 10/2004 | Hanna et al. | 713/155 |
| 7,043,760 | B2 * | 5/2006 | Holtzman et al. | 726/28 |
| 7,234,059 | B1 * | 6/2007 | Beaver et al. | 713/170 |
| 2002/0147906 | A1 * | 10/2002 | Lotspiech et al. | 713/158 |
| 2003/0115457 | A1 * | 6/2003 | Wildish et al. | 713/157 |
| 2003/0177352 | A1 * | 9/2003 | Camenisch et al. | 713/158 |
| 2006/0168446 | A1 * | 7/2006 | Ahonen et al. | 713/163 |

OTHER PUBLICATIONS

Boneh et al, "Anonymous Authentication With Subset Queries", 1999, ACM, pp. 113-119.*

* cited by examiner

*Primary Examiner*—Matthew B Smithers

(57) ABSTRACT

An authentication system and method for anonymous authentication of a data processing system from a group of data processing systems by a service provider are disclosed. A group key (110) is assigned to each data processing system (100) of the group of data processing systems. A service provider (120) is arranged to provide an encrypted authenticator (140) that is decryptable using the group key (110) to one of the data processing systems (100) to be authenticated and positively authenticate the data processing system upon receipt of data associated with the decrypted authenticator (130). Upon revocation of authentication rights of one of the data processing systems of the group, a new group key is distributed to the other data processing systems of the group using broadcast encryption.

23 Claims, 7 Drawing Sheets

AUTHENTICATION SYSTEM AND METHOD

FIELD OF THE INVENTION

The present invention relates to a system and method for anonymous authentication of a data processing system.

BACKGROUND TO THE INVENTION

There is increasing concern surrounding security of communications and transactions performed using computer systems and data networks. These concerns include exposure of data, system compromise due to software attack and lack of user trust.

Various mechanisms and technologies have been developed to address these concerns, although mechanisms intended to address different problems are not always compatible and complementary, resulting in conflicts and/or, new vulnerabilities.

A recent development is the provision of data processing system (referred to as a "platform") that is "trusted"—that is, can be relied on by the user to behave in a predictable manner and that subversion by another will at the least be apparent. Trusted computing system specifications have been developed by the Trusted Computing Platform Alliance and the Trusted computing group among others. In the Trusted Computing Group specification (found at www.trustedcomputing.org) and in the associated book "Trusted Computing Platforms: TCPA Technology in Context", edited by Siani Pearson and published July 2002 by Prentice Hall PTR (the contents of which are incorporated by reference herein to the extent permissible by law), there is described an approach to trusted computing which employs a trusted coprocessor (both physically and logically protected from subversion) to assure a user of data processing system including or associated with the trusted coprocessor that it is performing in a predictable and unsubverted manner. In addition or alternatively, a compartmentalised operating system may be used (typically by operating in a compartmentalised manner such that processes run in separated computing environments that have strictly controlled interaction with other computing environments—such an arrangement is discussed in, for example, the applicants' patent application published as EP1182557).

One advantage of using a trusted platform is that other parties will be ready to interact with the trusted platform if they have a means of assuring that it conforms to an agreed standard and will therefore behave in an expected manner. Such an other party may be a Remote Service Provider (RSP) who is able to provide a service to a platform, but may be unwilling to provide this service if it cannot be assured that the platform receiving the service is indeed trusted.

An RSP may be, for example, an enterprise server that provides services to remote platforms. The service is only provided to remote platform if the RSP can confirm that it is in a secure state (for example, verify that it was not stolen). In a different example, the RSP might provide digital content, such as music or video, to remote players. The RSP only provides the content if it can verify that the remote player is in a secure state, and does not enable, for example, illegitimate duplication of the content.

A trusted platform typically includes one or more trusted platform components (trusted components are described here as Trusted Platform Modules or TPMs) that may be a logical (software) or a physical (hardware) component within the platform. Whilst the trustworthiness of a TPM may be measured relative to a standard such as that of the Trusted Computing Group, it is typically be the manufacturer of the TPM vouching (and often providing a digital certificate certifying) for the trustworthiness of its module that imparts the trust. It can be assumed that an RSP will trust at least some manufacturers of TPMs. However, this leaves the difficulty for the RSP of ensuring that TPMs interacting with the RSP have indeed been produced by a trusted manufacturer.

In principle, a platform could provide information or certificates to an RSP to authenticate itself. However, it is desirable for privacy reasons for the RSP to be unable to distinguish which TPM it is interacting with (i.e. desirably all that the RSP will be able to establish is that it is interacting with a bona fide TPM manufactured by a known—and trusted—manufacturer) such that the platform and/or user cannot be identified or otherwise distinguished from other users or platforms.

One approach to providing such an assurance to an RSP is to use a further third party, a Certificate Authority (CA), trusted by both the platform's owner and the RSP. The TPM manufacturer provides a unique endorsement key for the TPM and then certifies it. The CA then issues a certificate on a randomly chosen identity after verifying the manufacturer's certificate. It is then the CA's certificate that is used by the RSP to check the validity of the TPM—if the certificate is verified, the RSP will trust the TPM to be an authentic product of the trusted manufacturer because the RSP trusts the CA. If the RSP finds out something wrong with a particular certified identity, the RSP reports this to the CA and the CA puts the problem identity in a revocation list and then refuses to certify any new identity to this TPM. The CA may or may not maintain a list of the mapping between endorsement keys and corresponding certificates.

In this scheme the CA is a weak point in the system—it potentially possesses a mapping between a TPM's Endorsement Key and identities issued to that TPM (and probably that of a large number of TPMs). If the CA reneges on a promise not to maintain such a mapping, or if the CA is permitted to keep such mappings as long as they are confidential but the CA's database is compromised, it becomes possible to correlate the identities of all TPMs which have been certified by that CA.

This is addressed in the applicant's co-pending patent application (PDNO 200312183-3 WO Application No GB2004/002185], the contents of which are incorporated herein by reference. In the disclosed system, a TPM is assumed authentic if it can prove it has a pre-agreed secret. A TPM is able to prove its authenticity by providing a product derived as a direct proof from its secret. In this manner, an RSP obtaining the direct proof can determine the TPM has a legitimate secret, but cannot determine the secret itself. In order to permit revocation of a TPMs trusted status, an arrangement discussed in which TPMs provide the direct proof to a certification authority that in return provides a certificate. Details of certificates previously associated with TPMs that have subsequently been unable to provide a direct proof of their authenticity are held in a blacklist. In this manner, the direct proof is used to obtain a certificate from a CA which certificate is subsequently used for authentication with an RSP. A certificate provided by a TPM to an RSP must be cross-referenced with the blacklist when determining the authenticity of the TPM.

Whilst this arrangement enables a TPM to assure an RSP that it is the authentic product of a trusted manufacturer without trusting a third party such as a CA with attestation information given by a manufacturer to the TPM, it introduces an overhead to the RSP in having to check the blacklist for each TPM encountered and also reduces the level of anonymity provided to the TPM (although the TPM cannot be directly traced from the information provided to either the CA or the RSP, information provided by TPMs must be differentiable so that blacklisted TPMs can be identified).

It is desirable for the authenticity of a TPM to be provable whilst retaining as much anonymity to the TPM and its associated platform as possible. In addition, it is desirable for this to be done in such a way that the status of the TPM can be revoked without allowing RSPs to become aware of the attestation information given by a manufacturer to the TPM that it is interacting with at any given time. It is further desirable for the provision or revocation of a RPM's trusted status be performed with as little computational and communication overhead as possible with respect to the RPM(s) and other TPMs.

STATEMENT OF INVENTION

According to an aspect of the present invention, there is provided an authentication system for anonymous authentication of a data processing system from a group of data processing systems by a service provider, the system comprising:

a group key assigned to each data processing system of the group of data processing systems;

a service provider arranged to provide an encrypted authenticator that is decryptable using the group key to one of the data processing systems to be authenticated and positively authenticate the data processing system upon receipt of data associated with the decrypted authenticator, wherein the authentication system is responsive upon revocation of authentication rights of one of the data processing systems of the group to distribute a new group key to the other data processing systems of the group using broadcast encryption.

According to another aspect of the present invention, there is provided an authentication system for anonymous authentication of a group of data processing systems by a service provider, the authentication system comprising a service provider and an authentication system manager independent of the service provider, the authentication system manager being arranged to provide a common group key to each authentic data processing system in the group and a corresponding key to the service provider, the service provider being arranged to generate an encrypted authenticator using the corresponding key and provide the encrypted authenticator to a data processing system to be authenticated, the encrypted authenticator being decryptable by the common group key and the service provider being arranged to positively authenticate the data processing entity upon receipt of data associated with the decrypted authenticator, wherein upon removal of a data processing system from the group, the authentication system manager is operative to provide a new group key to the remaining data processing systems of the group by a broadcast encryption mechanism.

According to another aspect of the present invention, there is provided an anonymous authentication system including a group of data processing systems, a service provider, wherein:

each data processing system in the group includes a group key common to the group;

the service provider is arranged to provide an encrypted authenticator that is decryptable using the group key to one of the data processing systems to be authenticated;

each data processing system of the group of data processing system is responsive upon receipt of an encrypted authenticator from a service provider to decrypt the encrypted authenticator using the group key and transmit the decrypted authenticator to the service provider;

the service provider is arranged to positively authenticate the data processing system upon receipt of data associated with the decrypted authenticator;

the authentication system is responsive upon revocation of authentication rights of one of the data processing systems of the group to distribute a new group key to the other data processing systems of the group using broadcast encryption.

According to another aspect of the present invention, there is provided an authentication system for anonymous authentication of a data processing system from a group of data processing systems by a service provider, the system comprising:

a logical key hierarchy, the root of the hierarchy being associated with a group key, each branch node being associated with a decryption key and each leaf node being associated with a data processing system of the group of data processing systems, the authentication system being arranged to assign decryption keys of each branch node between the root and respective leaf node to the respective data processing system associated with the leaf node thereby enabling access by the respective data processing system to the group key when encrypted using the logical key hierarchy;

a service provider arranged to provide an encrypted authenticator that is decryptable using the group key to one of the data processing systems to be authenticated and positively authenticate the data processing system upon receipt of data associated with the decrypted authenticator, wherein the authentication system is responsive upon revocation of authentication rights of one of the data processing systems of the group to distribute a new group key to the other data processing systems of the group using the logical key hierarchy.

According to another aspect of the present invention, there is provided an authentication system for anonymous authentication of a data processing system from a group of data processing systems by a service provider, the system comprising:

a group key assigned to each data processing system of the group of data processing systems;

a plurality of predefined disjoint subsets, each data processing system being associated with a plurality of subsets and each subset being assigned a key for decrypting received messages;

a service provider arranged to provide an encrypted authenticator that is decryptable using the group key to one of the data processing systems to be authenticated and positively authenticate the data processing system upon receipt of data associated with the decrypted authenticator, wherein the authentication system is arranged, in dependence on revocation of a data processing system from the group, to disregard subsets associated with the revoked data processing system and to distribute a new group key to data processing systems associated with non-disregarded subsets, the group key distributed to a subset being encrypted in dependence on the key of the respective subset.

According to another aspect of the present invention, there is provided a method of anonymously authenticating a data processing system from a group of data processing systems comprising:

assigning a group key to each data processing system of the group of data processing systems;

generating an encrypted authenticator that is decryptable using the group key; transmitting the encrypted authenticator to a data processing systems of the group to be authenticated;

positively authenticating the data processing system upon receipt of data associated with the decrypted authenticator, wherein upon revocation of authentication rights of one of the data processing systems of the group, the method comprising:

distributing a new group key to the other data processing systems of the group using broadcast encryption.

According to another aspect of the present invention, there is provided a computer readable medium having computer readable code means embodied therein for anonymously authenticating a data processing system from a group of data processing systems and comprising:

computer readable code means for assigning a group key to each data processing system of the group of data processing systems;

computer readable code means for generating an encrypted authenticator that is decryptable using the group key;

computer readable code means for transmitting the encrypted authenticator to a data processing systems of the group to be authenticated;

computer readable code means for positively authenticating the data processing system upon receipt of data associated with the decrypted authenticator, computer readable code means for distributing a new group key to the other data processing systems of the group using broadcast encryption upon revocation of authentication rights of one of the data processing systems of the group.

Although embodiments of the present invention are particularly applicable for use with trusted computing platforms such as those defined by the Trusted Computing Group, it will be appreciated that embodiments of the present invention could be used whenever trust relationships exist in relation to a secret between a possessor of the secret, a guarantor of the secret, and a party relying on the validity of the secret.

Embodiments of the present invention allow an entity such as a Trusted Platform Module (TPM) to convince an entity such as a Remote Service Provider (RSP) that it is a TPM certified by a trusted TPM manufacturer in such a manner that the RSP cannot distinguish which TPM he is communicating with.

BRIEF DESCRIPTION OF THE DRAWINGS

Embodiments of the present invention will now be described in detail, by way of example only, with reference to the accompanying drawings, in which.

DETAILED DESCRIPTION

Figure 1:
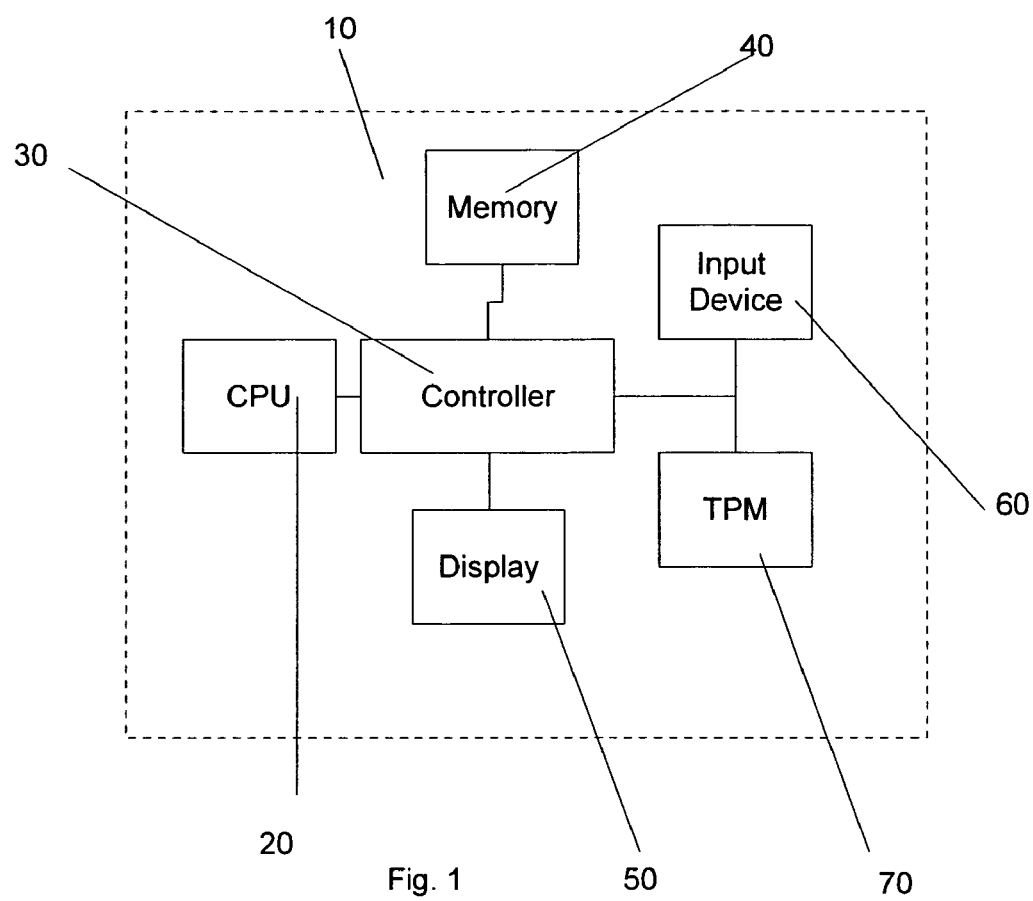
FIG. 1 is a schematic diagram of an example data processing system in the form of a computer platform including a TPM.

FIG. 1 is a schematic diagram of an example data processing system in the form of a computer platform including a TPM.

The computer platform 10 is a trusted platform of the type discussed in the Trusted Computing Platform Alliance specification.

The computer platform 10 includes a central processing unit (CPU) 20, a controller 30, a memory 40, a display 50, an input device 60 and a TPM 70. The CPU 20 is connected to the controller 30, which is in turn connected to the memory 40, display 50 and TPM 70.

Many configurations of the computer platform are possible and will depend on the purpose of the computer platform and personal preferences of the designer of the platform and/or the end user. For example, the controller 30 may be a motherboard, a collection of controllers (each connected via a bus to their respective devices or components and to each other), or some other component. The memory 40 may include a Random Access Memory, a hard disk, some other form of data storage device or any combination of these. Similarly, the input device 60 may include a keyboard, mouse, smart card reader, RFID tag reader, magnetic stripe card reader or any other input device. Selected components of the computer platform, such as the input device 60 and/or the display 50 may be omitted. Other components such as network interface devices, modems and the like may be included in the computer platform as needed.

As discussed above, the trusted platform module (TPM) 70 may be a physical component such as a video controller, storage device controller, network adapter, processor or the like or a logical component such as a software application, routine or environment. An example of an architecture for a TPM can be found in the Trusted Computer Group's Specification Architecture Overview (at www.trustedcomputing-group.org) and will not be discussed in further detail here.

By use of a TPM in a computing platform, there is enabled a level of trust between different computing platforms. It is possible to query such a trusted platform about its state, and to compare it to a trusted state, either remotely, or through a monitor on the computer entity.

The presence of the TPM makes it possible for a third party, either remote or local to the computing platform to communicate with the computing platform in order to identify it as authentic.

The advantages and applications of a trusted platform of this type are discussed in some detail in International Patent Application Publication Nos. WO00/48063 and WO00/54126 and in considerable detail in "Trusted Computing Platforms: TCPA Technology in Context", and will not be described further here.

Figure 2:
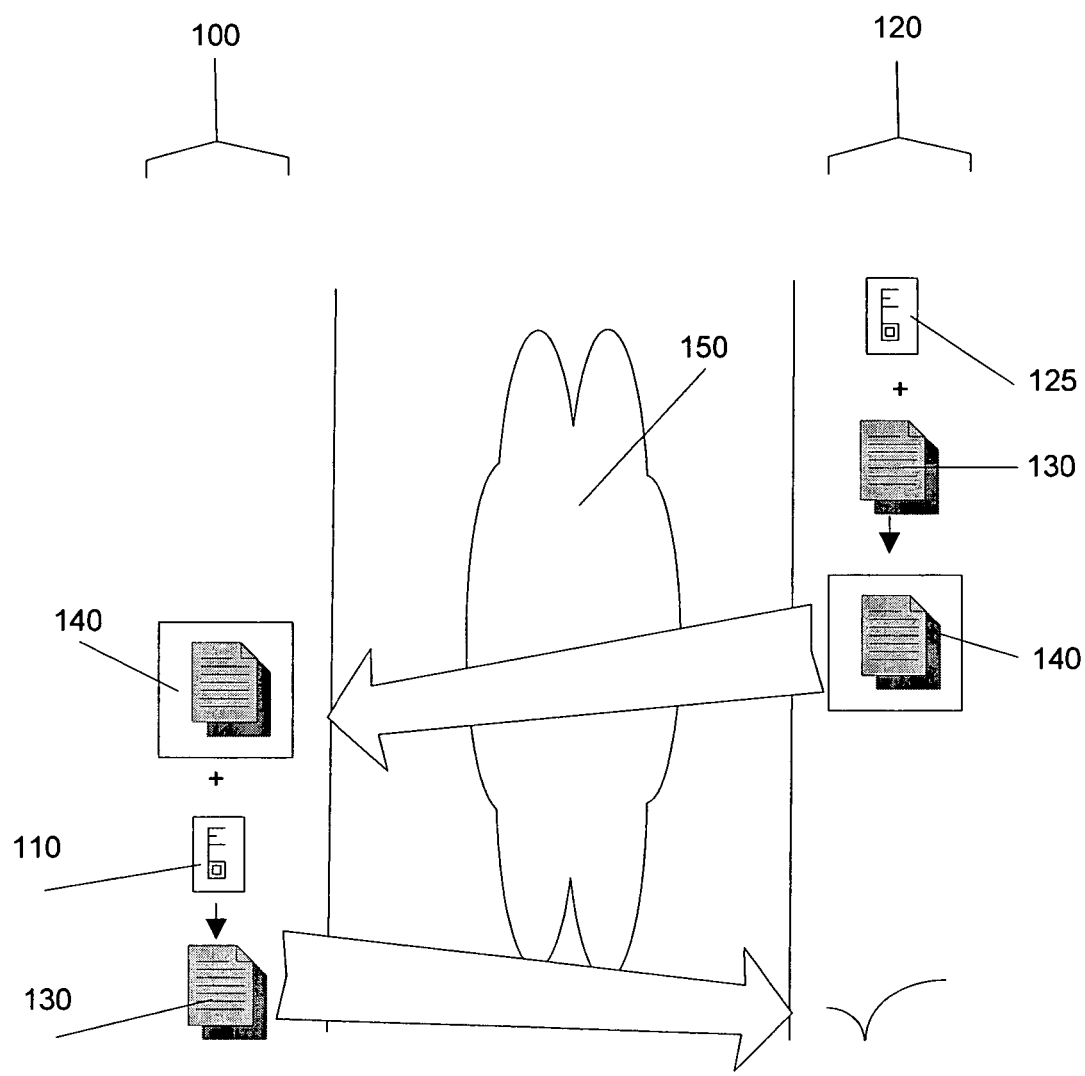
FIG. 2 is a schematic diagram illustrating a first mode of operation of an authentication system according to an embodiment of the present invention.

FIG. 2 is a schematic diagram illustrating a first mode of operation of an authentication system according to an embodiment of the present invention.

A client 100, which may be of the form of a platform including a TPM as discussed with reference to FIG. 1, is provided with a cryptographic decryption key 110 by its respective manufacturer or by a management system responsible for the authentication system. The cryptographic decryption key 110 is provided to the client to allow it to attest itself as being authentic and therefore trustworthy.

A service provider 120 is provided with an encryption key 125 by the management system for use in authenticating clients 100.

When the service provider 120 wishes to authenticate the client 100, it generates an authenticator 130, which it then encrypts with the encryption key 125 and sends the encrypted authenticator as a message 140 to the client 100 over a data communications network 150.

The decryption key 110 of the client 100 and the encryption key 125 of the service provider 120 are predetermined such that upon receipt of the message 140, the client is able to use the key 110 to decrypt the message 140 and obtain the authenticator 130. The client then sends the authenticator 130 back to the service provider 120 over the data communications network 150, proving their knowledge of the key 110 and thus their trustworthiness.

Figure 3:
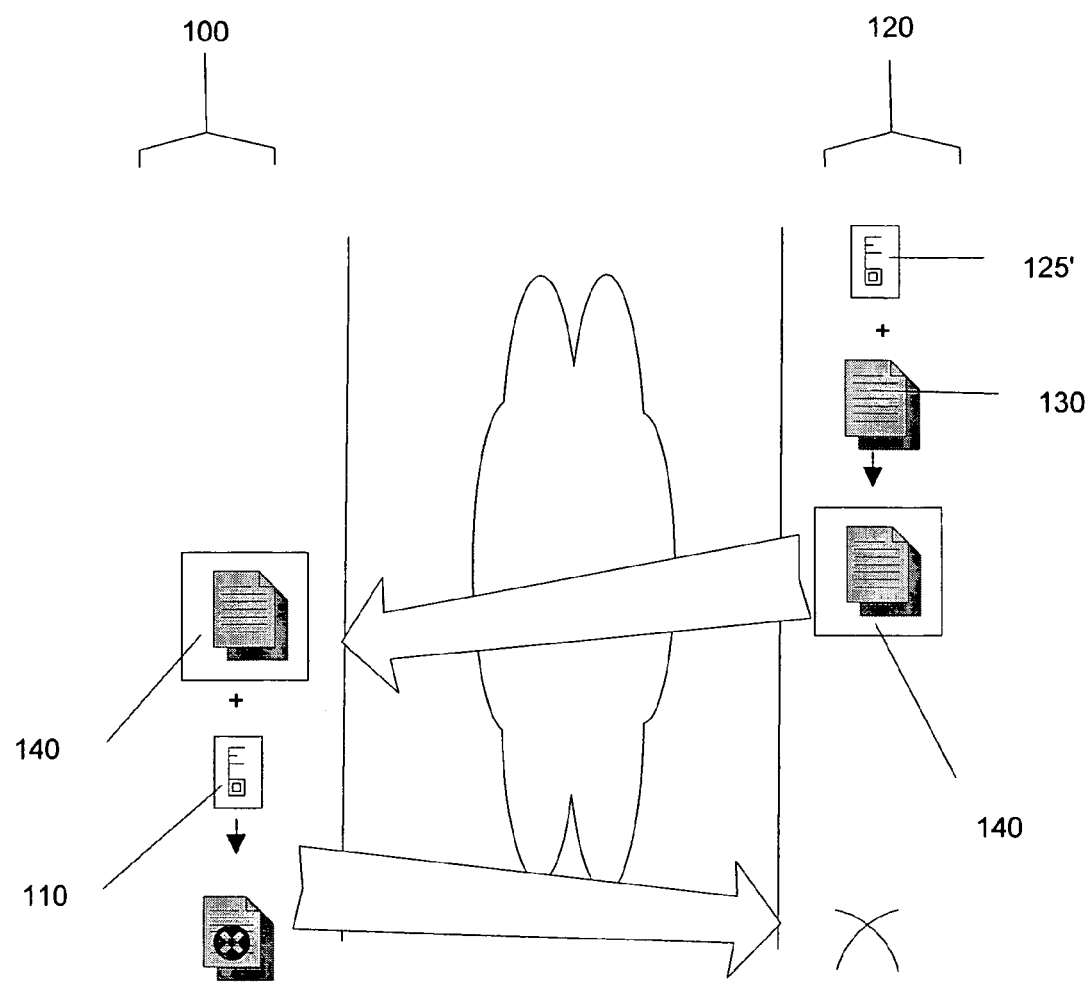
FIG. 3 is a schematic diagram illustrating a second mode of operation of the authentication system of FIG. 2.

FIG. 3 is a schematic diagram illustrating a second mode of operation of the authentication system of FIG. 2.

When the legitimacy of the client 100 is to be revoked, a management system changes the encryption key 125 of the service provider 120 to a new key 125'. When the service provider 120 next wishes to authenticate the client 100, it generates a new authenticator 130 which it then encrypts with the encryption key 125' and sends it as a message 140 to the client 100.

As the decryption key 110 of the client 100 is out of date with relation to the new key 125, upon receipt of the message 140 it is unable to successfully use its key 110 to decrypt the message 140 and obtain the authenticator 130. In this scenario, the client 100 will either send a response that does not match the authenticator 130 or it will not reply. In either case, the service provider 120 will be able to detect that the client is not legitimate.

The encryption key 125 and decryption key 110 may be symmetric or asymmetric (for example using public key encryption). Asymmetric encryption schemes are preferable as it does not require the service provider 120 to know the client's key 110, which can remain secret even if the service provider's key is compromised.

The messages may be low-level protocol data units handled transparently to the user by a system within the respective client's and service provider's network protocol stacks. Alternatively, the messages may be passed via email. The authenticator may be include nonce (a one time identifier associated with the particular message/authentication session that is typically a randomly generated number, the current time or a combination of the two), instructions on how to prove authenticity (such as the URL of a page on a website specifically generated for the authentication, the access of which can be detected by the RSP) or other information.

Preferably, communication between the client 100 and the service provider 120 is over a secure channel within the data communications network 150. The secure channel may be established before the message 140 is sent to the client 100 or upon receipt of the message 140 by the client 100, in which case the message itself may include data necessary for the client 100 to establish the secure channel.

The client 100 may use an alternate data communications network to send the authenticator back to the service provider 120.

Figure 4:
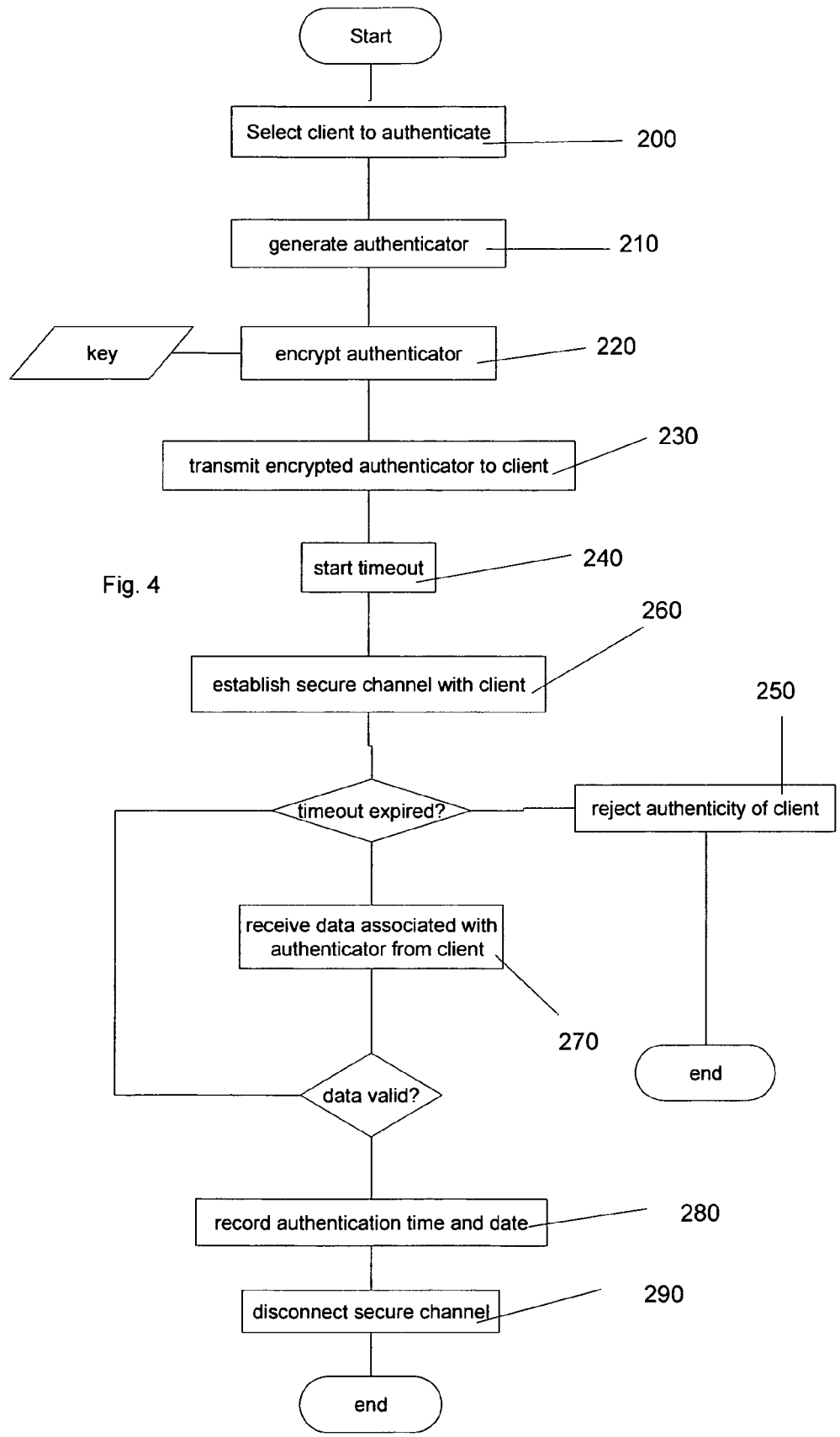
FIG. 4 is a flow diagram illustrating operation of service provider authenticating a client using a method according to an embodiment of the present invention.

FIG. 4 is a flow diagram illustrating operation of service provider authenticating a client using a method according to an embodiment of the present invention.

In step 200, the service provider determines it wishes to challenge the authenticity of a client. This may be due to a new client wishing to partake in the service provider's services or merely a periodic check. In step 210, an authenticator is generated by the service provider. The authenticator is encrypted in step 220 by a key held by the service provider and the encrypted authenticator is transmitted in step 230 to the client. Upon transmission of the encrypted authenticator, a timeout is initiated in step 240 by the service provider. If the timeout reaches a predetermined value before authentication is completed by the client, the service provider rejects the authenticity of the client in step 250. Upon receipt of the encrypted authenticator, the client is arranged to establish a secure communication channel with the service provider in step 260. The client then decrypts the encrypted authenticator and communicates data associated with the authenticator to the service provider across the secure channel in step 270. Upon receipt of correct data associated with the authenticator, the service provider updates its internal database in step 280 to indicate a time and date of authenticity of the client and disconnects the communication channel in step 290.

Although the above described method allows a client multiple submissions of data associated with the authenticator, for security purposes the method may limit submission to one or a limited number.

Figure 5:
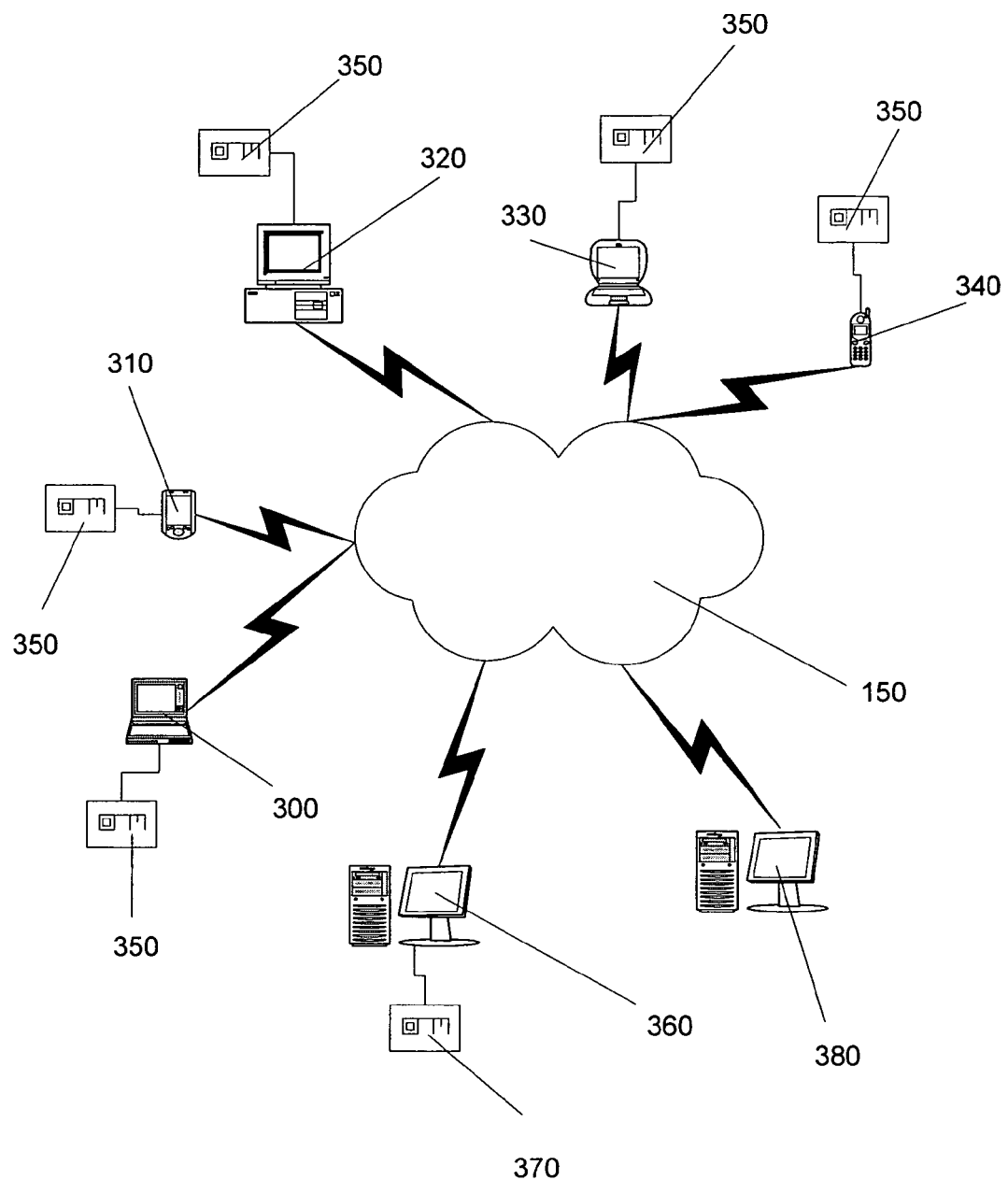
FIG. 5 is a schematic diagram of an authentication system according to a preferred embodiment of the present invention for use in authenticating a number of clients.

FIG. 5 is a schematic diagram of an authentication system according to a preferred embodiment of the present invention for use in authenticating a number of clients.

It will be appreciated that anonymous authentication of a client 100 lends itself to the provision of common services to multiple clients. In particular, it would be self defeating if a service provider had to use a different encryption key for each client as the client would then be linked to the encryption key and would no longer be anonymous.

In the preferred embodiment of FIG. 5, all legitimate clients 300-340 share the same cryptographic key, referred to as a group key 350. In this manner, a service provider 360 can authenticate any or all of the legitimate clients 300-340 in the manner discussed above with reference to FIGS. 2 and 3 by use of the same key 370 corresponding to the group key 350.

Figure 6:
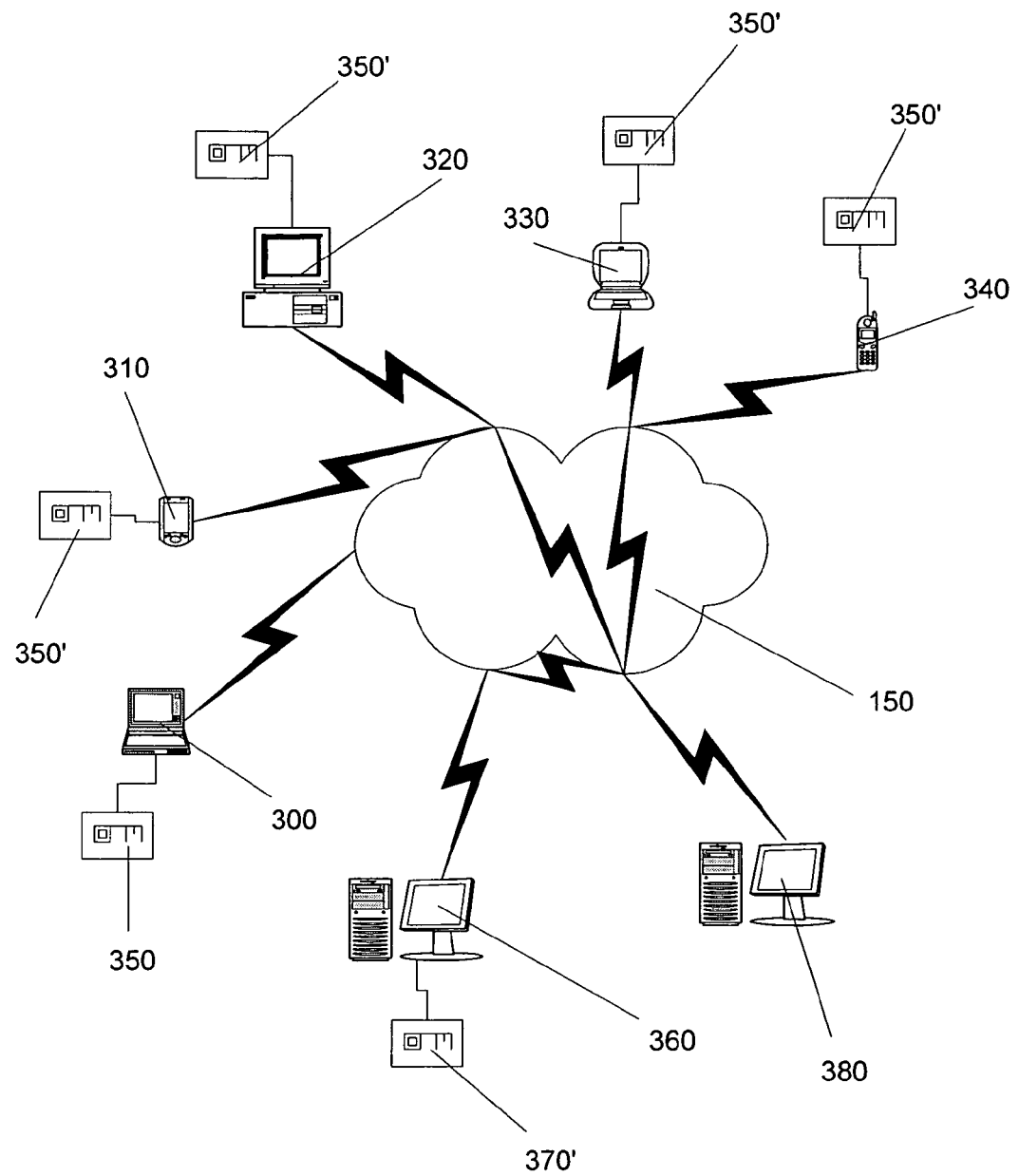
FIG. 6 is a schematic diagram illustrating the revocation of one of the clients of FIG. 5; and, FIG. 7 illustrates a preferred group key distribution arrangement using a Logical Key Hierarchy scheme.

When a client 300 is revoked (such as due to failure to pay a subscription fee or due to the client becoming untrustworthy), a group manager 380 is arranged to change the group key 350 held by all legitimate clients 310-340 to a new group key 350'. In a preferred embodiment of the present invention, the key 370 held by the service provider 360 is also changed (to 370') as is illustrated in FIG. 6. This is to prevent revoked client 300 authenticating itself.

Preferably a broadcast encryption scheme is used to manage and distribute the group key 350. Preferably group key update is performed immediately after client revocation to prevent a revoked client authenticating itself. Alternatively, the group key may be updated periodically (for example once per day or per week) to legitimate clients. In this arrangement, although revocation would not be immediate, a service provider could be provided in advance with encryption keys to be used for each particular time period.

Preferably group key distribution is performed using LKH (Logical Key Hierarchy), as is discussed in Internet Engineering Task Force RFC2627, a copy of which is incorporated by reference.

Figure 7:
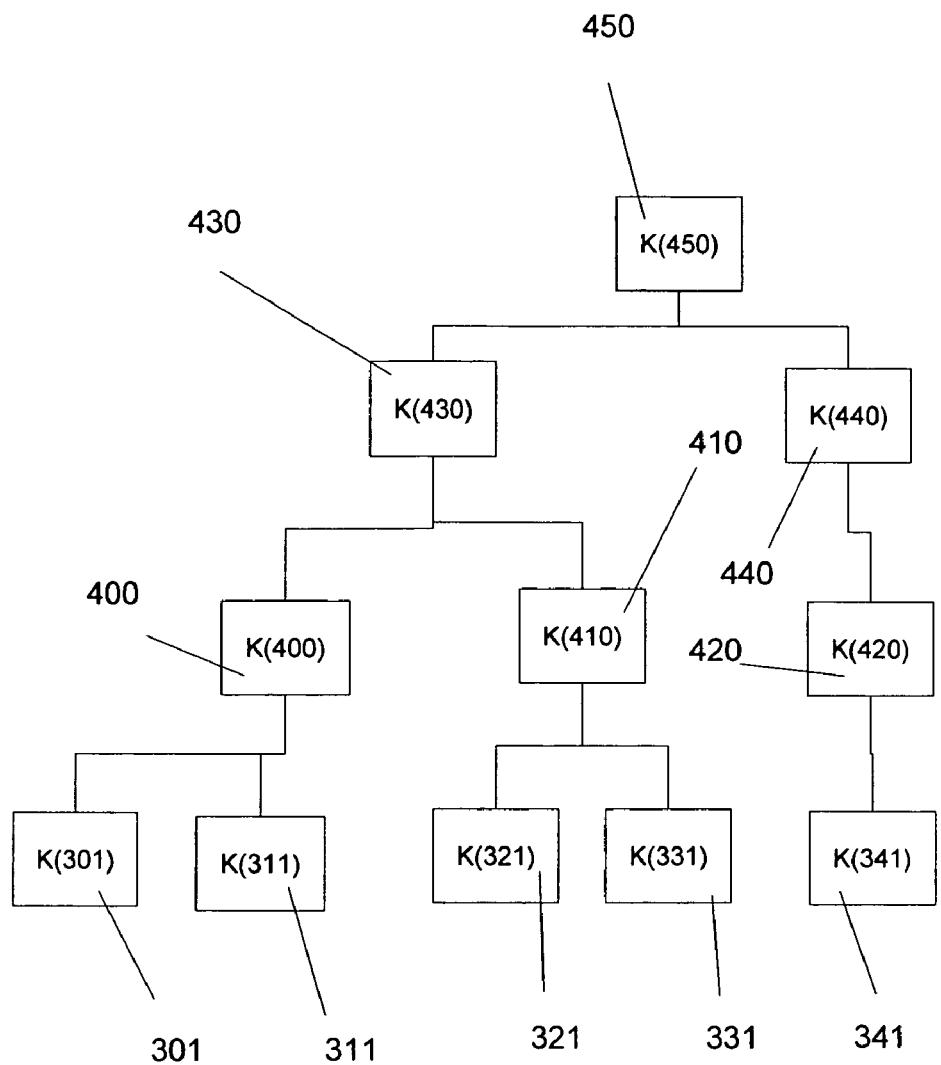

FIG. 7 illustrates a preferred group key arrangement using LKH. A binary tree is established by the group manager 380 such that each leaf node 301-341 is associated with a client 300-340.

Each client 300-340 establishes a unique pairwise key with the group manager 380. This can be done using a key exchange protocol. Once each client 300-340 has a pairwise key known to the group manager 380, the respective key is associated with the leaf 301-341 of the respective client. The group manager 380 then generates a key for each intermediate node 400-450 in the tree.

Starting with those nodes 400-420, all of whose children are leaves, and proceeding via the next level 430-440 towards the root 450, the group manager 380 transmits the key for each node 400-450, encrypted using the keys for each of that node's children. At the end of the process, each client 300-340 can determine the keys corresponding to those nodes above its respective leaf 301-341. The root node key is used as the group key 350.

For the following discussion, the notation k(xxx) means the key for node xxx.

For example, client 310 will agree a key K(311) with the group manager and will subsequently receive a key K(400) encrypted by K(311) followed by K(430) encrypted by K(400) followed by K(450) encrypted by K(430).

It is possible to transmit all of the intermediate node keys and root node key in one message, where the node keys would all be encrypted with the unique pairwise key of the individual leaf. In this manner, only one transmission (of a larger message) is required per client to receive all of the node keys. It is noted for this method, that the client would require some means to determine which key corresponds to which node level.

Suppose that client 300 is revoked, as discussed above. In this scenario, all of the keys held by client 300 (K(301), K(400), K(430), K(450)) must be changed and distributed to the clients who need them, without permitting client 300 or anyone else from obtaining them.

To do this, the keys held by client 300 identified above are replaced, proceeding from the bottom of the tree upwards. The group manager 380 chooses a new key K(400)' for the lowest node 400 and transmits it to client 310 encrypted using K(311). K(430) is replaced with K(430)' and transmitted to client 310 encrypted using K(400)' and to clients 320 and 330 encrypted using K(410). The group key K(450) is replaced with a new group key K(450)' and transmitted to clients 310, 320 and 330 encrypted using K(430)' and to client 340 encrypted using K(440). Even if client 300 obtains the new encrypted group key, it will not have received new keys K(400)' or K(430)' in order to access it.

In this example, five transmissions will be required to revoke client 300 and to provide a new group key to the other 4 clients. If the same strategy is taken a to send multiple keys in one message, the number of transmissions required can be reduced even further As an alternative to the above described scheme, group key distribution and revocation could be performed using a so called stateless mechanism, such as those described in US 20020147906 and US 2020133701 which are herein incorporated by reference. In such stateless mechanisms, client keys are not updated after revocation of a subset of clients. The subset of clients considered to be revoked are instead excluded from being able to decrypt a received message. Such mechanisms are arranged such that all non-revoked clients are covered by predefined disjoint subsets. Each subset is assigned a key for decrypting received messages. Messages are encrypted so that only clients belonging to a subset including no revoked clients can decrypt the message, and every non-revoked client belongs to such a subset. The advantage of the "stateless" mechanisms is that clients are not required to update their keys when revocations take place.

Although the above description has focussed on the use of TPMs within computer platforms that would normally be described as Personal Computers (PCs) or servers, TPMs and equivalent systems can be used within any computing platform including Personal Digital Assistants (PDAs), cellular telephones, embedded computing platforms such as those used in point of sale terminals, cashpoints, control systems and set-top boxes.

The invention claimed is:

1. An authentication system for anonymous authentication of a data processing system from a group of data processing systems by a service provider, the system comprising:
   a group key assigned to each data processing system of the group of data processing system wherein the same group key is assigned to each data processing system of the group; and
   a service provider arranged to provide an encrypted authenticator that is decryptable using the group key to one of the data processing systems to be authenticated and positively authenticate the data processing system upon receipt of data associated with the decrypted authenticator,
   wherein the authentication system is responsive upon revocation of authentication rights of one of the data processing systems of the group to distribute a new group key to the other data processing systems of the group using broadcast encryption.

2. A system as claimed in claim 1, wherein the broadcast encryption uses a logical key hierarchy, the group key comprising the root of the logical key hierarchy.

3. A system as claimed in claim 2, wherein a node within the hierarchy is associated with a decryption key, each data processing system of the group being associated with a leaf node of the hierarchy and being provided with the decryption key of each node between the root and the respective leaf node to enable access to the group key.

4. A system as claimed in claim 3, wherein upon revocation of authentication rights of one of the data processing systems of the group, the authentication system is arranged to replace the group key and decryption key of any node previously provided to the revoked data processing system and to distribute the replaced keys to data processing systems in the group except the revoked data processing system that were previously provided with the respective keys.

5. A system according to claim 1, wherein the broadcast encryption comprises a stateless mechanism.

6. A system according to claim 5, wherein the group of data processing systems is divided into a plurality of predefined disjoint subsets, each data processing system being associated with a plurality of subsets and each subset being assigned a key for decrypting received messages, wherein upon revocation of rights of a data processing system, the authentication system is operative to revoke subsets associated with the revoked data processing system and transmit a new group key to each non-revoked subset, the new group key being encrypted in dependence on the key of the respective subset.

7. A system according to claim 1, wherein the group key is symmetric to a key used by the service provide to generate an encrypted authenticator.

8. A system according to claim 1, wherein the group key is asymmetric to a key used by the service provider to generate an encrypted authenticator.

9. An authentication system according to claim 1, wherein the data processing system includes a trusted platform module arranged to decrypt a received encrypted authenticator using the group key and transmit data on the authenticator to the service provider.

10. An authentication system according to claim 9, wherein the data processing system is a selected one of: a Personal Computer (PCs), a Personal Digital Assistant (PDA), a cellular telephone, a point of sale terminal, a cashpoint, a control system or a set-top box.

11. An authentication system for anonymous authentication of a group of data processing systems by a service provider, the authentication system comprising a service provider and an authentication system manager independent of the service provider, the authentication system manager being arranged to provide a common group key to each authentic data processing system in the group and a corresponding key to the service provider, the service provider being arranged to generate an encrypted authenticator using the corresponding key and provide the encrypted authenticator to a data processing system to be authenticated, the encrypted authenticator being decryptable by the common group key and the service provider being arranged to positively authenticate the data processing entity upon receipt of data associated with the decrypted authenticator, wherein upon removal of a data processing system from the group, the authentication system manager is operative to provide a new group key to the remaining data processing systems of the group by a broadcast encryption mechanism.

12. An anonymous authentication system including a group of data processing systems, a service provider, wherein:

each data processing system in the group includes a group key common to the group;

the service provider is arranged to provide an encrypted authenticator that is decryptable using the group key to one of the data processing systems to be authenticated;

each data processing system of the group of data processing system is responsive upon receipt of an encrypted authenticator from a service provider to decrypt the encrypted authenticator using the group key and transmit the decrypted authenticator to the service provider;

the service provider is arranged to positively authenticate the data processing system upon receipt of data associated with the decrypted authenticator;

the authentication system is responsive upon revocation of authentication rights of one of the data processing systems of the group to distribute a new group key to the other data processing systems of the group using broadcast encryption.

13. An authentication system for anonymous authentication of a data processing system from a group of data processing systems by a service provider, the system comprising:

a logical key hierarchy, the root of the hierarchy being associated with a group key, each branch node being associated with a decryption key and each leaf node being associated with a data processing system of the group of data processing systems, the authentication system being arranged to assign decryption keys of each branch node between the root and respective leaf node to the respective data processing system associated with the leaf node thereby enabling access by the respective data processing system to the group key when encrypted using the logical key hierarchy;

a service provider arranged to provide an encrypted authenticator that is decryptable using the group key to one of the data processing systems to be authenticated and positively authenticate the data processing system upon receipt of data associated with the decrypted authenticator, wherein the authentication system is responsive upon revocation of authentication rights of one of the data processing systems of the group to distribute a new group key to the other data processing systems of the group using the logical key hierarchy.

14. An authentication system for anonymous authentication of a data processing system from a group of data processing systems by a service provider, the system comprising:

a group key assigned to each data processing system of the group of data processing systems, wherein the same group key is assigned to each data processing system of the group;

a plurality of predefined disjoint subsets, each data processing system being associated with a plurality of subsets and each subset being assigned a key for decrypting received messages; and a service provider arranged to provide an encrypted authenticator that is decryptable using the group key to one of the data processing systems to be authenticated and positively authenticate the data processing system upon receipt of data associated with the decrypted authenticator, wherein the authentication system is arranged, in dependence on revocation of a data processing system from the group, to disregard subsets associated with the revoked data processing system and to distribute a new group key to data processing systems associated with non-disregarded subsets, the group key distributed to a subset being encrypted in dependence on the key of the respective subset.

15. A method of anonymously authenticating a data processing system from a group of data processing systems comprising:

assigning a group key to each data processing system of the group of data processing systems, wherein the same group key is assigned to each data processing system of the group;

generating an encrypted authenticator that is decryptable using the group key;

transmitting the encrypted authenticator to a data processing systems of the group to be authenticated; and positively authenticating the data processing system upon receipt of data associated with the decrypted authenticator, wherein upon revocation of authentication rights of one of the data processing systems of the group, the method comprising:

distributing a new group key to the other data processing systems of the group using broadcast encryption.

16. A method as claimed in claim 15, wherein the broadcast encryption uses a logical key hierarchy, the group key comprising the root of the logical key hierarchy.

17. A method as claimed in claim 16, further comprising:

associating a node within the hierarchy a decryption key;

associating each data processing system of the group with a leaf node of the hierarchy;

providing the decryption key of each node between the root and the respective leaf node to the respective data processing system to enable access to the group key.

18. A method as claimed in claim 17, wherein upon revocation of authentication rights of one of the data processing systems of the group, the method further comprising:

replacing the group key and decryption key of any node previously provided to the revoked data processing system;

distributing the replaced keys to data processing systems in the group except the revoked data processing system that were previously provided with the respective keys.

19. A method according to claim 15, further comprising:

dividing the group of data processing system into a plurality of predefined disjoint subsets;

associating each data processing system with a plurality of the subsets;

assigning each subset a key for decrypting received messages;

wherein upon revocation of rights of a data processing system, the method further comprising:

revoking subsets associated with the revoked data processing system;

encrypting the new group key in dependence on the key of each respective subset; and, transmitting the encrypted new group key to each non-revoked subset.

20. A computer readable medium having computer readable code means embodied therein for anonymously authenticating a data processing system from a group of data processing systems and comprising:

computer readable code means for assigning a group key to each data processing system of the group of data processing systems, wherein the same group key is assigned to each data processing system of the group;

computer readable code means for generating an encrypted authenticator that is decryptable using the group key;

computer readable code means for transmitting the encrypted authenticator to a data processing systems of the group to be authenticated;

computer readable code means for positively authenticating the data processing system upon receipt of data associated with the decrypted authenticator; and computer readable code means for distributing a new group key to the other data processing systems of the group using broadcast encryption upon revocation of authentication rights of one of the data processing systems of the group.

21. A computer readable medium as claimed in claim 20, further comprising:

computer readable code means for generating a logical key hierarchy;

computer readable code means for associating the group key with the root of the hierarchy;

computer readable code means for associating a node within the hierarchy a decryption key;

computer readable code means for associating each data processing system of the group with a leaf node of the hierarchy;

computer readable code means for providing the decryption key of each node between the root and the respective leaf node to the respective data processing system to enable access to the group key.

22. A computer readable medium as claimed in claim 21, further comprising:

computer readable code means for replacing the group key and decryption key of any node previously provided to a revoked data processing system;

computer readable code means for distributing the replaced keys to data processing systems in the group that were previously provided with the respective keys except a revoked data processing system.

23. A computer readable medium according to claim 20, further comprising:

computer readable code means for generating a plurality of disjoint subsets;

computer readable code means for associating each data processing system with a plurality of the subsets;

computer readable code means for assigning each subset a key for decrypting received messages; and computer readable code means operative upon revocation of a data processing system from the group to:

revoke subsets associated with the revoked data processing system;

encrypt the new group key in dependence on the key of each respective subset; and, transmit the encrypted new group key to each non-revoked subset.

* * * * *

UNITED STATES PATENT AND TRADEMARK OFFICE
CERTIFICATE OF CORRECTION

| | |
|---|---|
| PATENT NO. | : 7,516,326 B2 |
| APPLICATION NO. | : 10/965197 |
| DATED | : April 7, 2009 |
| INVENTOR(S) | : Binyamin Pinkas |

It is certified that error appears in the above-identified patent and that said Letters Patent is hereby corrected as shown below:

In column 10, line 6, in Claim 1, delete "system" and insert -- systems, --, therefor.

In column 10, line 51, in Claim 7, delete "provide" and insert -- provider --, therefor.

Signed and Sealed this
Eighth Day of March, 2011

David J. Kappos
*Director of the United States Patent and Trademark Office*